(12) United States Patent
Ali et al.

(10) Patent No.: US 8,806,481 B2
(45) Date of Patent: Aug. 12, 2014

(54) PROVIDING TEMPORARY EXCLUSIVE HARDWARE ACCESS TO VIRTUAL MACHINE WHILE PERFORMING USER AUTHENTICATION

(75) Inventors: Valiuddin Y. Ali, Cypress, TX (US); Manuel Novoa, Cypress, TX (US); Christopher I Dalton, Bristol (GB); Boris Balacheff, Bristol (GB); Shab H Madina, Houston, TX (US); Lan Wang, Cypress, TX (US); Jeffrey C Parker, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 12/873,197

(22) Filed: Aug. 31, 2010

(65) Prior Publication Data
US 2012/0054741 A1    Mar. 1, 2012

(51) Int. Cl.
*G06F 9/455* (2006.01)
*G06F 9/445* (2006.01)
*G06F 21/00* (2013.01)
*G06F 15/177* (2006.01)

(52) U.S. Cl.
USPC ............ 718/1; 718/102; 726/2; 726/4; 726/5; 726/26; 726/28

(58) Field of Classification Search
None
See application file for complete search history.

(56) References Cited

U.S. PATENT DOCUMENTS

| | | |
|---|---|---|
| 6,003,050 A | 12/1999 | Silver et al. |
| 6,247,148 B1 | 6/2001 | Annicchiarico et al. |
| 7,167,987 B2 * | 1/2007 | Angelo .................. 713/186 |
| 7,417,626 B2 | 8/2008 | Aull et al. |
| 8,332,930 B2 * | 12/2012 | Burton et al. .................. 726/17 |
| 2004/0080529 A1 | 4/2004 | Wojcik |
| 2004/0215971 A1 | 10/2004 | Nam |
| 2005/0108579 A1 * | 5/2005 | Isaacson et al. .............. 713/202 |
| 2005/0198632 A1 * | 9/2005 | Lantz et al. ....................... 718/1 |
| 2006/0036731 A1 | 2/2006 | Mossman et al. |
| 2006/0101128 A1 | 5/2006 | Waterson |
| 2006/0136910 A1 | 6/2006 | Brickell et al. |
| 2006/0259674 A1 * | 11/2006 | Dunstan et al. ............... 710/240 |
| 2007/0022196 A1 * | 1/2007 | Agrawal ....................... 709/225 |
| 2007/0061590 A1 * | 3/2007 | Boye et al. ................... 713/186 |
| 2007/0300223 A1 * | 12/2007 | Liu .................................. 718/1 |
| 2008/0005320 A1 * | 1/2008 | Chen ............................ 709/224 |
| 2008/0028441 A1 * | 1/2008 | Novoa et al. ...................... 726/4 |
| 2008/0086729 A1 * | 4/2008 | Kondoh et al. ..................... 718/1 |
| 2008/0127355 A1 * | 5/2008 | Lorch et al. ...................... 726/29 |
| 2008/0141277 A1 * | 6/2008 | Traut et al. ..................... 719/313 |
| 2008/0244292 A1 * | 10/2008 | Kumar et al. ................. 713/323 |
| 2009/0064292 A1 * | 3/2009 | Carter et al. ...................... 726/5 |
| 2009/0125974 A1 * | 5/2009 | Zhang et al. ...................... 726/1 |

(Continued)

OTHER PUBLICATIONS

Dalton, Chris I. et al., "Trusted Virtual Platforms: A Key Enabler for Converged Client Devices" ACM SIGOPS Operating Systems Review, vol. 43, Issue 1 (Jan. 2009) pp. 36-43.

Hewlett-Packard Development Company, L.P., "HP ProtectTools: Authentication Technologies and Suitability to Task" 5983-1956EN Rev. 2 (Jun. 2005) pp. 1-9.

(Continued)

*Primary Examiner* — Meng An
*Assistant Examiner* — Benjamin Wu (57) ABSTRACT

A computer system includes an authentication service running in a virtual machine. The authentication service uses the hardware components of the computer system in performing a user authentication process and responds to a remote call from another virtual machine by performing the user authentication process and returning a result.

18 Claims, 3 Drawing Sheets

(56) References Cited

U.S. PATENT DOCUMENTS

| | | | |
|---|---|---|---|
| 2009/0172820 A1* | 7/2009 | Watson | 726/26 |
| 2009/0193511 A1* | 7/2009 | Noe et al. | 726/9 |
| 2009/0235174 A1* | 9/2009 | Royt | 715/735 |
| 2009/0249337 A1* | 10/2009 | Vasilevsky et al. | 718/1 |
| 2009/0320125 A1* | 12/2009 | Pleasant et al. | 726/17 |
| 2011/0083016 A1* | 4/2011 | Kesanupalli et al. | 713/180 |
| 2011/0084801 A1* | 4/2011 | Wang et al. | 340/5.82 |

OTHER PUBLICATIONS

Hewlett-Packard Development Company, L.P., "Authentication Services: Part of the HP ProtectTools Portfolio" 4AA1-1463EEE (Created Mar. 2007; Rev. 1, Jun. 2010) pp. 1-4.

Hewlett-Packard Development Company, LP., "HP ProtectTools Authentication Services, White Paper" (Apr. 27, 2004) pp. 1-6.

* cited by examiner

PROVIDING TEMPORARY EXCLUSIVE HARDWARE ACCESS TO VIRTUAL MACHINE WHILE PERFORMING USER AUTHENTICATION

BACKGROUND

An important aspect of security in computers and computing systems is authentication of the identity of a user. Strong user authentication often employs multifactor authentication, which may require a password, a mechanical token such as a smart card or USB token, and/or recognition of a distinctive biological token of the user such as a fingerprint, a facial pattern, or a retinal pattern. Multifactor authentication typically requires use of specific subsystems such as a card reader, a camera, a finger print sensor, and a retinal scanner that an operating system or application requiring user authentication can access. Unfortunately, the communications between authentication subsystems and an operating system or application are subject to attack and impersonation. This has required manufacturers to add security capabilities in each authentication subsystem. For example, a fingerprint sensor may need the ability to provide tamper resistance against replay, man-in-the-middle attacks, and unauthorized modifications of matchers and templates (both in transit and in storage). The addition of security capabilities generally increases the complexity and cost of authentication subsystems. A side effect of the increased complexity is differences in authentication subsystems from different manufacturers, which makes it more difficult to produce a computing system that works with authentication subsystems from different manufacturers. Further, even with additional levels of security, authentication subsystems may still have vulnerabilities to attacks through malware, Trojans, and viruses, so that the subsystems are still not highly secure.

In the past, applications often needed extensive modification to take advantage of various authentication tokens such as a smart card, fingerprints, or a facial pattern. Systems and methods are needed to increase the security of user authentication while delivering lower cost and greater flexibility.

BRIEF DESCRIPTION OF THE DRAWINGS

Use of the same reference symbols in different figures indicates similar or identical items.

DETAILED DESCRIPTION

In accordance with an aspect of the present invention, simple devices, peripherals, or subsystems such as keyboards, webcams, and USB interfaces can provide authentication tokens without requiring the subsystems to implement complicated and expensive security protection measures. For security, an authentication service can be isolated in a secure virtual machine within a computer system, and a virtualization layer of the computing environment can dynamically or permanently provide the authentication service with exclusive access to subsystems needed for authentication of a user. Accordingly, during an authentication process, devices such as keyboards and camera, which may at other times be shared with other less secure virtual machines, are temporarily exclusive resources of an authentication virtual machine. The authentication process being in a secure virtual machine and having exclusive access to required subsystems is thus more secure from malware that may be running in other virtual machines. When authentication is complete, the subsystems to which the authentication virtual machine had exclusive access can be released for general use or kept as the exclusive resource of the authentication virtual machine if the subsystem is not needed by other virtual machines. In addition to increasing security, use of a secure virtual machine for the authentication service can also simplify testing of authentication functionality.

Figure 1:
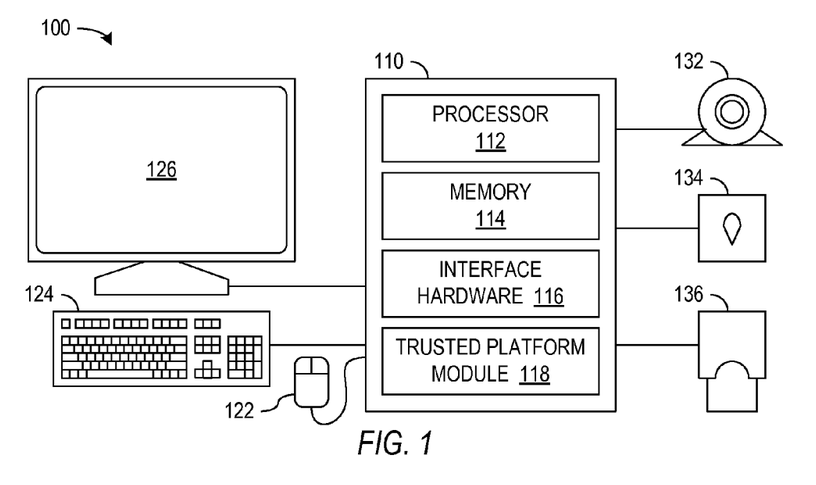
FIG. 1 shows a computer system in which an authentication virtual machine in accordance with an embodiment of the invention can be implemented.

The secure nature of exclusive access with a secure virtual machine permits secure authentication without requiring component subsystems to implement expensive security protocols. The reduction in component complexity can reduce overall computer costs and complexity and give computer manufacturers more flexibility in selection of components used in authentication. FIG. 1 shows a computer system 100 in which an authentication virtual machine can be implemented. Computer system 100 can be a personal computer that is portable or otherwise, a smart phone, or any computing device for which user authentication may be desired. In the illustrated configuration, computer system 100 includes core circuitry 110 connected to components such as a pointing device 122 (e.g., a mouse), a keyboard 124, a display 126, a camera 132, a fingerprint sensor 134, and a card reader 136. Some or all of components 122, 124, 126, 132, 134, and 136 may be integrated within a shared enclosure with core circuitry 110 of computer system 100 or may be peripherals connected to core circuitry 110 through external cabling.

Core circuitry 110 can be on a motherboard, a combination of motherboards and daughter boards, or any suitable configuration for the circuitry desired in computer system 100. Computer architectures and corresponding core circuitry, which are well known in the art and constantly in a state of development, can be used for core circuitry 110 of computer system 100. FIG. 1 shows only one example of core circuitry 100 to illustrate a definite embodiment of the invention. In the illustrated embodiment, core circuitry 110 includes a processor or processors 112 such as an x86 microprocessor, a memory 114 such integrated circuit memory (e.g., DRAM) and/or a disk drive system, interface hardware 116 such as USB interfaces, and a trusted platform module (TPM) 118.

TPM 118 is a hardware component having sealed storage hardware isolation that make the capabilities of TPM 118 secure from malicious software that may be executed in computer system 100. Some capabilities of TPM 118 typically include remote attestation, generation cryptographic keys, and secure storage of encryption of information. For remote attestation, TPM 118 can securely create evidence in the form of a hash key that indicates the state of the hardware and/or software of computer system 100. A remote party can use the hash key to verify that computer system 100 is in a verified state. TPM 118 can further employ a root encryption key, which may be burned into TPM 118 during production, or employ a trusted key descended from the root key to encrypt information. The TPM specification (e.g., TPM specification is 1.2 Revision 103, published on Jul. 9, 2007) promulgated by the Trusted Computing Group describes a standard for trusted platform modules generally and is hereby incorporated by reference in its entirety.

FIG. 1 illustrates some common types of components that may be employed in a multifactor authentication process in accordance with the present invention. For example, pointing device 122, keyboard 124, and display 126 may be used in a user interface. An authentication service can use a graphic user interface and components 122, 124, and 126 to provide instructions to a user or receive input from the user. For example, an authentication service can use display 126 to instruct a user to take a particular action such as entering a password or answering a question using keyboard 124, looking into camera 132, touching fingerprint sensor 134, or inserting a smart card into card reader 136. TPM 118 can be used to provide keys for encryption and decryption of token information securely stored for comparison with token information that the user provides using other components of computer system 100. TPM 118, keyboard 122, camera 132, fingerprint sensor 134, and card reader 136 illustrate components that may have uses in an authentication process and also to different extents have uses in other processes. In particular, keyboard 122 may be required for password entry, but typically, many applications executed in computer system 100 will require user input through keyboard 122. Camera 132 may be used for image input during facial recognition of an authentication process and also used for general image or video capture or webcam applications. Other devices such as fingerprint sensor 134 and card reader 136 may have limited or no use outside of authentication processes. FIG. 1, as noted above, illustrates examples of components, and computer system 100 can include other computer system components that are known or may be developed.

Figure 2:
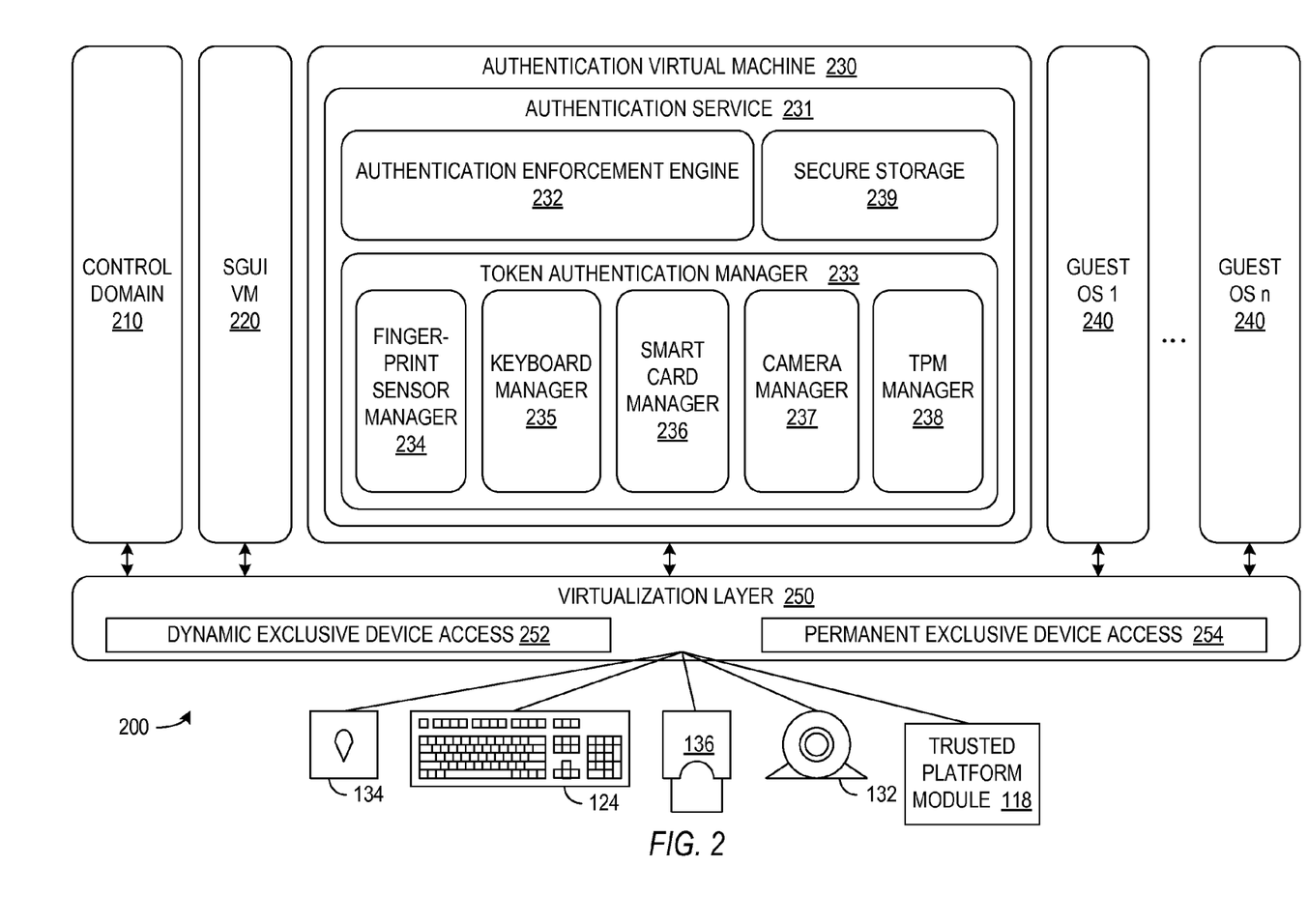
FIG. 2 shows the logical partitioning of virtual machines in an embodiment of the invention that dynamically provides an authentication virtual machine with exclusive access subsystems that may be used for user authentication or other purposes.

Some additional examples of components that are not illustrated in FIG. 2 but may be included in a computer system and used in multifactor authentication processes include microphones, accelerometers, or a global positioning system (GPS). More generally, any device capable of providing a computer system with "token" information or a user secret via a bus such as a USB, 1394, or serial/parallel legacy port or an interface such as a Bluetooth or Near Field Communication (NFC) interface can be used during an authentication process. For example, a generic USB flash drive or a mobile telephone can be used as an external "token" that can then be combined with password, fingerprint, voice recognition, or other tokens used in a multifactor authentication.

In accordance with an aspect of the invention, an authentication service is implemented in a virtual machine where the fundamental and well established security properties of a virtualized environment are used to strengthen the security of the authentication system. The security characteristics of the secure virtual machine allow removal of complex cryptographic and security protocols from components such as camera 132, fingerprint sensor 134, and even card reader 136. This can reduce the complexity and cost of these components, while allowing component selection based on a specific function of the particular device (e.g., a fingerprint or other biometric sensor selected for the best biometric performance, rather than data security capabilities.)

FIG. 2 illustrates the logical relations of software layers and some hardware components of a computer system 200 in accordance with an embodiment of the invention. In the illustrated embodiment, system 200 includes an authentication service 231 inside a virtual machine sometimes referred to herein as an authentication virtual machine 230. More generally, how the authentication service is packaged is not critical as long as the authentication service provides services over a secure interface that can be used and secured among multiple virtual machines using suitable protocols (e.g., using an existing and well established protocol such as the secure socket layer or SSL.)

The logical architecture of computer system 200 includes virtual machines 210, 220, 230, and 240 using shared hardware 118, 124, 132, 134, and 136. Virtual machines 210, 220, 230, and 240 in computer system 200 are distinguished as being a control domain 210, a secure graphical user interface (SGUI) virtual machine 220, an authentication virtual machine 230, and guest virtual machines 240, which a virtualization layer 250 monitors. An exemplary embodiment of computer system 200 uses a Xen system for virtual machine monitoring. Xen provides an example of virtual machine monitoring that is currently well known, but the choice of Xen or more generally a virtual machine architecture including a control domain 210 as illustrated in FIG. 2 is simply for illustration of one specific embodiment of the invention. Some other currently available virtual machine architectures are provided through products such as VMWare ESX, Parallels Workstation, and CITRIX Xen Server to name a few. Implementations of authentication virtual machine 230 more generally do not require the specific configuration of computer system 200 to use a Xen-type or any other specific type of virtualization.

Virtualization layer 250 is a software layer used to virtualize hardware interfaces to virtual machines 210, 220, 230, and 240 disposed on a partitioned memory space of computer system 200. For the Xen-based embodiment, virtualization layer 250 corresponds to the Xen hypervisor, which is the lowest and most privileged software layer. Control domain 210, SGUI virtual machine 220, authentication virtual machine 230, and guest virtual machines 240 are above virtualization layer 250 and therefore have less privilege. Further, virtualization layer 250 controls distribution of the processing tasks in virtual machines 210, 220, 230, and 240 across the processor or processors of computer system 200.

Control domain 210 runs a control operating system and in Xen terminology is referred to as "domain 0" or "dom0." In general, the control operating system in control virtual machine 210 boots automatically when virtualization layer 250 boots, and versions of Xen with control operating systems such as Linux, NetBSD and Solaris as the dom0 are known. Under the Xen system, the operating system of control domain 210 receives special management privileges. In particular, a system administrator can log into control domain 210 in order to manage any guest operating systems in guest virtual machines 240. As noted above, a control operating system and a special control domain 210 is not required in alternative embodiments of the invention.

The guest operating systems in virtual machines 240 are commonly referred to as "domain U" or "domU" in Xen terminology. Several operating systems may function as guest operating systems (domU) in virtual machines 240 if the guest operating system is compatible with the hardware of computer system 200, e.g., if the processing core or cores (not shown) of computer system 200 support x86 virtualization. Guest operating systems OS1 to OSn in virtual machines 240 may be the same or different for different virtual machines 240, and typically, operating system OS1 to OSn are used for running of applications such as, but not limited to, an internet browser, a word processing application, a spread sheet application, a calendaring application, or a financial management application. In general, guest operating systems OS1 to OSn may be vulnerable to malicious software.

SGUI virtual machine 220 provides a secure graphical user interface for use by control domain 210, authentication virtual machine 230, and guest virtual machines 240. The exact architectural and design details for SGUI virtual machine 220 is not critical to the authentication processes and the presence of a separate SGUI virtual machine in unnecessary for some embodiments of the invention. However, SGUI virtual machine 220 can provide a secure and consistent user interface for secure user authentication processes initiated by applications running under different operating systems in virtual machines 240. SGUI virtual machine 220 may be used to solicit graphical based input without the risk that the input is spoofed in the OS. For example, SGUI virtual machine 220 can ensure the user is typing in a window controlled by authentication virtual machine 230, and not a window associated with a rogue procedure that is trying to steal credentials. In alternative embodiments, a secure graphical user interface may be part of or run in authentication virtual machine 230 or control domain 210 or may be omitted.

Authentication virtual machine 230 is a secured virtual machine containing an authentication service 231. In particular, authentication virtual machine 230 can be a small, dedicated code base for an operating system that is not running general services. The code surface is generally small with narrow and well controlled interfaces into authentication virtual machine 230. There are many ways to construct authentication virtual machine 230 and authentication services 231, and embodiments of authentication virtual machine 230 and services 231 are not limited to only being based on a specific base operating system or a specific set of services. In some alternative embodiments from the embodiment shown in FIG. 2, authentication virtual machine 230 is not separated from control domain 210. For example, authentication service 231 may be run within control domain 210. Authentication service 231 includes an authentication enforcement engine 232, a token authentication manager 233, and secure storage 239. Authentication enforcement engine 232 controls user authentication processes. Token authentication manager 233 generally manages and all authentication tokens and in the specific embodiment of FIG. 2, includes device manager software 234 to 238 for hardware components employed in a user authentication process. In the illustrated embodiment, managers 234, 235, 236, 237, and 238 are respectively for a fingerprint sensor 134, a keyboard 124, a card reader 136, a camera 132, and a trusted platform module 118. More generally, the token authentication managers 233 in authentication virtual machine 230 may depend on the specific hardware components available for user authentication, whether or not that specific hardware is currently employed in computer system 200.

Authentication service 231 implements an interface or a set of functions or procedures that may be called from any of virtual machines 210, 220, and 240 using remote procedure calls. For example, authentication service 231 may implement the functionality of ProtectTools family of security products from Hewlett-Packard Company. In particular, the IPTAuthenticate interface from ProtectTools allows an application to store a user specific secret in a secure environment (e.g., secure storage 239), so that the application can request retrieval of that secret at a later stage after the user is forced to authenticate using system specified multifactor authentication policies. Further, authentication service 231 can extend the authentication functionality for use by multiple applications running under multiple (disparate) operating systems running at the same time in virtual machines 240. Some specific features of the interface of an exemplary embodiment of authentication service 231 are described further below.

Authentication enforcement engine 232 in authentication service 231 controls user authentication processes that enforce authentication policies represented by data structures in secure storage 239. The user authentication processes generally employ the available system hardware (e.g., devices or subsystems 118, 124, 132, 134, and 136) to perform a multifactor user authentication. In general, authentication enforcement engine 232 represents a daemon process with a logic execution section that enforces the authentication policy for an application and user by authenticating the user through the specified policy and required tokens. In general, authentication enforcement engine 232 exposes authentication service 231 over the remote procedure call channels of virtualization layer 250, and upon receiving an authentication request, interfaces with various tokens to authenticate the user at runtime using managers 234 to 238 in accordance with the required authentication policy (and/or use of the tokens).

Managers 234 to 238, sometimes referred to herein as Token Configuration Managers (TCM), typically contain drivers, configuration software, or other software required for access to respective hardware components employed in a user authentication process. TCMs 234 to 238 may be responsible for configuring individual authentication tokens which may be stored in secure storage 239 for use in system 200 and to personalize the tokens and logically tie the tokens to users, allowing the users to authenticate themselves later using these tokens. In general, each authentication device is associated with a different type of token, and different TCMs respectively corresponding to the devices may be needed to represent the respective token type at run time. At a broader level, a TCM uses a device specific SDK (suitable for an operating system) to initialize and configure a token. For example, smart cards need to be initialized with a global access PIN, and smart card manager 236 can use reader 136 to interface with an inserted smart card. TCM 236 can use the SGUI 220 to alert the user to insert the smart card (if not already inserted or available), ask the user to enter a PIN (if not already initialized) through secure keyboard input, and then initialize the smart card.

Authentication virtual machine 230 places authentication service 231 in a secure environment that is ideally secure from malicious software. In particular, virtualization layer 250 protects authentication service 231 and authentication virtual machine 230 from corruption or insertion of suspect software, which may be present with the user selected applications and other software run in guest virtual machines 240. Such protection can be achieved through the isolation capabilities of virtualization layer 250, hardware support for virtualization that is available in some CPUs and chipsets, and appropriate configuration parameters of system 200. In particular, virtualization layer 250 can be configured to provide narrow, well controlled interfaces for access to authentication virtual machine 230 and to ensure memory and process isolation for virtual machine 230. In contrast, if the authentication service were run under one of the guest operating systems, such authentication service could be vulnerable to malicious software that may be executed in the same environment and may have access to the same address space as the authentication service. Finally, virtualization layer 250 controls the mappings of hardware to specific virtual machines, and virtualization layer 250 further enhances the security of user authentication processes by granting to authentication virtual machine 230 exclusive access to hardware components 118, 124, 132, 134, and 136 during an authentication process.

The capability to provide exclusive access means that virtualization layer 250 is able to "guarantee" that all "bus level traffic" for specified set of devices is visible only to a specific virtual machine or application. In particular, proper configuration or tuning of virtualization layer 250 can virtualize the buses of system 200 so that each virtual machine 210, 220, 230, or 240 only receives what virtualization layer 250 passes up, which is not necessarily the original bus traffic. In other words, virtualization layer 250 can assign selectable bus traffic to a specific virtual machine and filter or segregate bus traffic before presenting a "virtualized" bus or buses to the virtual machines. Accordingly, with proper configuration of virtualization layer 250, authentication virtual machine 230 will be able to see and control the functionality of target components without worrying about potentially malicious application stacks snooping on or altering the traffic between the components and authentication service 231. From a security perspective, the conventional requirements of cryptography to protect the privacy and integrity of communications with authentication components (e.g., subsystems 118, 124, 132, 134, and 136) are less critical since any sensitive information exchange with a component cannot be intercepted by non-intended applications (or malware) unless the operation of virtualization layer 250 is compromised. For example, a current biometric sensor such the fingerprint reader (FPR) may need an authentication engine, integrity verification systems, secure timers, and secure storage to prevent tampering with templates when used in a conventional operating system that cannot provide full isolation of the traffic during a user authentication process. If communications can be otherwise guaranteed to be secure, as in computer system 200, security systems in biometric devices can be eliminated, saving costs and reducing subsystem complexity, and information can be communicated in clear, i.e., without encryption. Accordingly, some or all of subsystems 118, 124, 132, 134, and 136 may be without cryptographic systems and without secure storage because communications are secured by the virtualization architecture and because secure storage 239 in authentication service 231 can store any token information, e.g., passwords and biometric signatures, required for user authentication.

Computer system 200 through virtualization layer 250 has two types of device isolation capabilities, dynamic device isolation 252 to a virtual machine and permanent device isolation 254 to a virtual machine. Virtualization layer 250 can implement dynamic device isolation 252 by temporarily ensuring that all of the traffic for a selected device or subsystem is only routed between the device and a particular virtual machine (e.g., authentication virtual machine 230). More generally, virtualization layer 250 will only need to allocate temporary exclusive access to a device or subsystem if two or more of virtual machines 210, 220, 230, and 240 sometimes require access to the device, e.g., for tasks other than authentication. A prime example of a device or subsystem that has both authentication and non-authentication uses is keyboard 124, which is normally used as a general input device that can be shared by multiple virtual machines but is restricted to exclusive communication with authentication virtual machine 230 (or SGUI virtual machine 220) when authentication virtual machine 230 needs keyboard 124 to gather security credentials.

Figure 3:
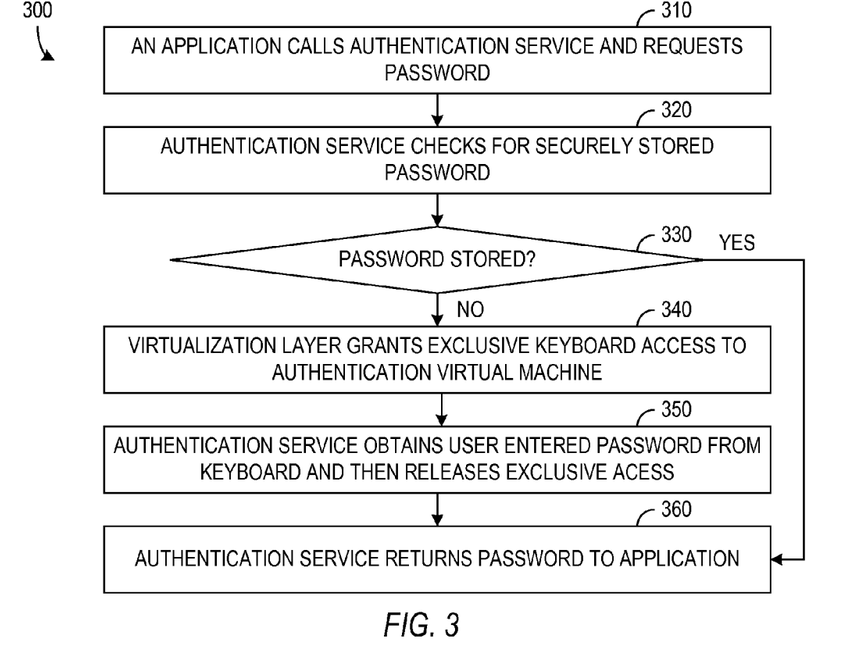
FIG. 3 is a flow diagram of an authentication process in accordance with an embodiment of the invention in which an authentication virtual machine has temporary exclusive access to a computer subsystem during a user authentication process.

FIG. 3 illustrates an example of a process 300 in which exclusive access is granted to authentication virtual machine 230 while authentication service 231 obtains a password from a user. In step 310, an application in one guest virtual machine 240 requires a user password and calls authentication service 231 to request the particular password. For example, a browser running in a virtual machine 240 may respond to a web form fill requested by calling authentication service 231. Optionally, authentication service 231 can maintain authentication information such as passwords in secure storage 339, which authentication service 231 checks in step 320. If authentication service 231 determines in step 330 that the requested password was previously obtained from the user and is available, authentication service 231 can return the password to the calling application in step 360. If the password is not available, virtualization layer 250 in step 340 grants exclusive access to keyboard 124 to authentication virtual machine 230. While authentication virtual machine has exclusive access, none of the guest virtual machines 240 has access to or receives any traffic from keyboard 124. The actual redirection or limitation of keyboard traffic will be forced by authentication virtual machine 230 making a specific runtime request to virtualization layer 250 asking for exclusive (secure) control of the target device. Virtualization layer 250 can then respond as appropriate based on permission set available for the virtual machine (i.e., authentication virtual machine 230) making the request. For a Xen-based system, authentication virtual machine 230 may have a permission set that is "equivalent" to the permission set of Dom0 210, so that virtualization layer 250 will grant exclusive access to authentication virtual machine 230 and confirm exclusive status before authentication virtual machine 230 begins accessing keyboard 124 to obtain the password. During the secure mode operation, virtualization layer 250 directs "ALL" input traffic and related events to the virtual machine (e.g., authentication virtual machine 230) that requested exclusive control over keyboard 124. At the same time, authentication virtual machine 230 or SGUI virtual machine 220 may request and be granted exclusive access to a display or other device. Authentication service 231 can then obtain from keyboard 124 the password that the user entered. Authentication virtual machine 230 can then relinquish the secure and exclusive control of keyboard 124 when authentication virtual machine 230 is finished with keyboard 124.

Process 300, which provides authentication virtual machine 230 with temporary exclusive access to keyboard 124, can be similarly used to grant temporary access to any system resource. However, some devices or subsystems may only have permitted uses associated with user authentication, in which case virtualization layer 250 can provide permanent device isolation. Permanent exclusive access or isolation is in addition to dynamically or switchable control of the device traffic, and a virtual machine such as authentication virtual machine 230 can request "permanent" control of a set of devices at system assembly or install time of the devices. Permanent exclusive access ensures that devices that are targeted for exclusive access of a particular virtual machine are not shared, so that no further need for a protocol to acquire and release such devices is warranted. The exclusive control in one virtual machine may result in other virtual machines being unaware of the existence of these devices, or alternatively, other virtual machines may be aware of the specified devices but unable to obtain any control of the devices. In general, system 200 requires specific guarantees that when a particular device is isolated to a virtual machine, all of the device specific bus traffic, irrespective of how many other devices may be on the same bus, are visible only to the software stack in the specified controlling virtual machine. For example, if authentication virtual machine 230 has permanent exclusive access to a fingerprint sensor 134, which may be connected on a USB bus, all activity related to fingerprint sensor 134 "must" be routed to authentication virtual machine 230 irrespective of how many other devices are on the same USB bus. Permanent exclusive access can be implemented using standard USB hardware and bus traffic filtering in virtualization layer 250 so that all virtualized machines access a virtualized USB bus. However, hardware provisions could be made to allow for secure mapping of individual USB devices.

Control domain 210, SGUI domain 220, and authentication virtual machine 230 can be considered to be a distributed control domain having higher levels of privileges than do guest virtual machines 240. Such a distributed control domain could be implemented using a trusted virtual client architecture such as described by Chris Dalton et al., "Trusted virtual platforms: a key enabler for converged client devices," ACM SIGOPS Operating Systems Review, Volume 43, Issue 1, pp. 36-43 (2009). More generally, some provisions of a purposely designed client can be useful, but no specific "client" architecture is necessary to enable embodiments of the invention.

Authentication service 231 can implement a standardized interface for authentication of users. One particular embodiment authentication service 231 corresponds to the Protect-Tools Authentication Interface. This interface is designed to provide a generic, high level Application Programming Interface (API) that allows disparate applications to register and authenticate users using a system defined multi-factor authentication policy. A primary advantage of this implementation is that authentication service 231 isolates individual applications from the details of the use of various hardware tokens, allowing those applications to more easily take advantage of strong user authentication schemes. A side benefit is that each application may but does not need to manage how users should authenticate, thereby promoting a unified user experience and methodology for authentication. This further simplifies complexity of design in applications needing user authentication.

Authentication service 231 can be exposed through a Remote Procedure Call (RPC) interface in a virtualized environment of FIG. 2. The exemplary embodiment of authentication service 231 has four categories of accessible procedures, namely registration, authentication, storage service, and user management, which are described further below.

Registration functions are designed to allow applications (with multiple profiles) to register themselves and their target users with authentication service 231, passing along an optional security payload. Authentication service 231 may also allow an application to provide user specified "suggestions" on the type of tokens that should or could be used to authenticate the user at a later time. The name of the application, the user name, and the payload, along with domain specific information makes a "unique profile" for the application and authentication service. This technique can be used by an application to register multiple profiles for the same user for different functionalities for the application. For example, a wireless connection manager application can request one payload to authenticate a user for using LAN/PAN services, and require a different (perhaps higher) level of authentication for use of the WAN service (e.g., due to potentially higher cost constraints related to the WAN usage). Based on the specific policies in place, the security payload is then stored inside a "Storage" pool of authentication service 231. The application can request the security payload back when the user needs to be authenticated and choose to use the payload in an application specific manner.

Authentication functions of authentication service 231 authenticate users. For user authentication, an application can simply request back the payload registered during registration. Upon invocation, authentication service 231 starts secure GUI services in SGUI virtual machine 220 from Authentication and Enforcement Engine (AEE) 232 of authentication service 231. AEE 232 through SGUI virtual machine 220 displays the user interface that allows a user to start interacting with AEE 232, choosing specific tokens for user authentication. The details can vary for how the user is authenticated and typically depend on the available hardware and chosen authentication policies. Once the user is authenticated, authentication service 231 "extracts" the registered payload and returns the extracted payload back to the application along with the appropriate authentication status and policy information (e.g., indicating what tokens were used).

Storage service in authentication service 231 can use secure storage 239 for user authentication information. A primary issue in prior authentication systems was that the main operating system was considered too unsafe to store any secrets with reasonable expectations of protections and privacy guarantees. However, if the BIOS domain is "NO LONGER" an important pre-boot consideration for the virtualization time, then authentication virtual machine 230 will be up and running by the time the first guest OS or any applications running on an OS needs user authentication. Since the virtualization architecture guarantees that only authentication virtual machine 230 (or the trustworthy entities such as control domain 210 or virtualization layer 250) is/are the "only" entity that has access to storage in authentication virtual machine 230, secrets (e.g., stored in a password vault or SSO database) do not need to be stored inside each of the token subsystems such as cameras, fingerprint sensors, or smart cards. This further simplifies the architecture and support required in authentication hardware.

User management in authentication service 231 can allow editing (including deleting and updating), navigating, and searching the list of already registered applications, profiles, users, and the registered payloads. For example, an application can use the user management functionality of authentication service 231 to: investigate whether the application is already registered; update user secrets as needed; update user data such as name, domain, or computer name changes; remove users; enumerate or list registered users; or enumerate or list registered application profiles (e.g., management applications.)

Figure 4:
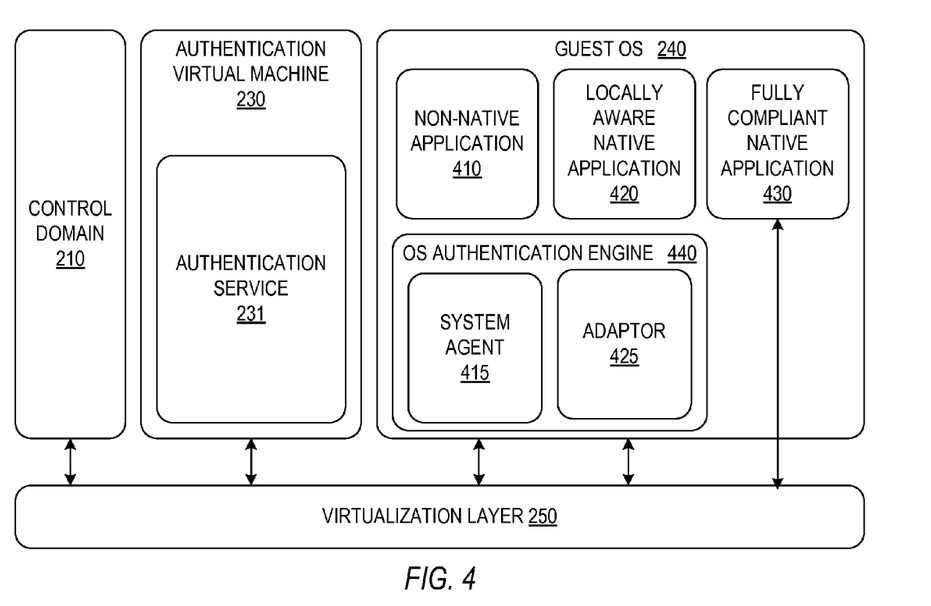
FIG. 4 is a block diagram illustrating a system in which applications having different degrees of compliance with the protocols of a remote authentication service access the authentication service.

Client applications that access authentication service 231 may have different degrees of awareness or compliance with the RPC interface of authentication service 231. FIG. 4 illustrates an example in which a non-native application 410, a native application 420 that is locally aware, and a native application 430 that is fully compliant are running in a guest virtual machine 240. Non-native application 410 may be a legacy application that does not employ any standardized interface for user authentication. Some examples of legacy applications include current versions of Microsoft Office or Outlook and current web portals such as Yahoo mail and web banking portals. For non-native application 410, a local system agent 415 can be executed in the same guest virtual machine 240 to enable the calling of authentication service 231 on behalf of non-native application 410. Local system agent 415 can be implemented, for example, via the system wide hooks or via browser extensions such as browser helper objects (BHOs) that intercept or convert accesses to authentication hardware into remote procedure calls to authentication services 231. System agent 415 can be implemented as part of an authentication engine 440 of guest operating system 240. Native application 420 is an application that employs a protocol for procedures such as those implemented by authentication service 231, but native application 420 expects the authentication procedures to run within the same virtual machine 240. For native application 420, an adaptor object or façade 425 for remote authentication service 231 can be provided in OS authentication engine 440 and convert calls that application 420 makes to authentication engine 440 into remote procedure calls to authentication service 231; Native application 430, which is written to take advantage of the remote authentication service 231, can directly call authentication service 231 through the remote procedure call channels of virtualization layer 250.

Authentication virtual machine 230 and authentication service 231 can also be called at boot time of a computer system to identify and authenticate a user of the computer system. In particular, with the system of FIG. 2 or 4, authentication service 231 can be called or run once virtualization layer 250 sets up authentication virtual machine 230 and loads authentication service 231. Accordingly, before guest operating systems are booted up in guest virtual machines 240, authentication service 231 can authenticate a user and inform guest operating systems of the identity of an authenticated user when the guest operating systems are loaded. BIOS level authentication, if needed before authentication service 231 is loaded, can be limited to passwords using conventional techniques.

The systems and processes described above can be employed in a computer or any systems and devices in which user authentication is desired. Further, the processes can be at least partly implemented using software or firmware products containing machine readable instructions that are executed by a computer or other system containing a processor to carry out a process in accordance with an embodiment of the invention, and those products can be embodied as a physical media containing the machine readable instructions.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A computer system comprising:
   a plurality of hardware components; and
   a processor executing a computing environment comprising:
      a virtualization layer implementing a plurality of virtual machines (VMs) within the computer system, wherein the virtualization layer controls the sharing of one or more of the plurality of hardware components by the plurality of VMs; and
      an authentication service running in a first virtual machine of the plurality of VMs, the authentication service using the one or more of the plurality of hardware components to perform a user authentication process;
   wherein the authentication service performs the user authentication process and returns a result of the user authentication process to a second virtual machine of the plurality of VMs, in response to a remote procedure call from the second virtual machine and upon determining that an authentication of a user of the computer system is required;
   the virtualization layer operates to dynamically provide the first virtual machine with exclusive access to the one or more of the plurality of the hardware components when the authentication service performs the user authentication process by accessing each of the one or more hardware components; and
   the virtualization layer further operates to release the one or more hardware components for use by other VMs executing within the computing environment upon the completion of the user authentication process.

2. The system of claim 1, wherein the user authentication process comprises a multifactor user authentication process that uses multiple tokens respectively provided through the one or more of the plurality of hardware components while the first virtual machine has exclusive access to the one or more hardware components.

3. The system of claim 1, wherein any of the plurality of virtual machines can access the one or more of the plurality of hardware components when the virtualization layer releases the one or more hardware components from exclusive access by the first virtual machine.

4. The system of claim 1, wherein the one or more hardware components used to perform the user authentication process comprise of one or more components selected from the group consisting of a keyboard, a microphone, a camera, a trusted platform module, a fingerprint sensor, an accelerometer, a global positioning system, a card reader, and a device storing a user secret.

5. The system of claim 1, wherein each of the one or more hardware components communicates with the authentication service in clear when performing the user authentication process.

6. The system of claim 1, wherein each of the one or more hardware components does not include a cryptographic system.

7. The system of claim 1, wherein the first virtual machine requires secure storage containing token information associated with the one or more hardware components used for performing the user authentication process, and wherein the hardware components do not include secure storage.

8. The system of claim 1, wherein the first virtual machine comprises a secure virtual machine.

9. The system of claim 8, wherein only the authentication service is permitted to run in the first virtual machine.

10. The system of claim 1, wherein the remote procedure call from the second virtual machine is from an application running within the second virtual machine.

11. The system of claim 1, wherein the second virtual machine includes a system agent that converts accesses to the one or more hardware components used for performing the authentication process into remote procedure calls to the authentication service.

12. The system of claim 1, wherein the second virtual machine includes an authentication engine that converts calls to the authentication engine in the second virtual machine into remote procedure calls to the authentication service.

13. The system of claim 1, wherein the user authentication process comprises a multifactor user authentication process that uses multiple tokens respectively provided through the one or more hardware components.

14. The system of claim 1, wherein the first virtual machine is a control domain having a highest priority of the plurality of VMs.

15. A method, performed in a computing environment having a virtualization layer implementing a plurality of virtual machines (VMs) within the computing environment, wherein the virtualization layer controls the sharing of one or more of the plurality of the hardware components by the plurality of the VMs, comprising:
   establishing an authentication service in a first virtual machine of the plurality of virtual machines, the authentication service using the one or more of the plurality of hardware components to perform a user authentication process;
   performing, by the authentication service, the user authentication process and returning a result of the user authentication process to a second virtual machine of the plurality of VMs, in response to a remote procedure call from the second virtual machine and upon determining that an authentication of a user is required;

granting, dynamically and by the virtualization layer, the first virtual machine with exclusive access to one or more of the plurality of hardware components when the authentication service performs the user authentication process by accessing each of the one or more hardware components; and releasing, by the virtualization layer, the one or more hardware components for use by other VMs executing within the computing environment upon the completion of the user authentication process.

16. The method of claim 15, wherein the one or more hardware components used to perform the user authentication process comprise one or more components selected from the group consisting of a keyboard, a camera, a trusted platform module, a fingerprint sensor, and a card reader.

17. The method of claim 15, wherein the second virtual machine includes an authentication engine that converts calls to the authentication engine in the second virtual machine into remote procedure calls to the authentication service.

18. A non-transitory computer readable media comprising instructions that when executed by a processor of a computing environment having a virtualization layer implementing a plurality of virtual machines (VMs) within the computing environment, wherein the virtualization layer controls the sharing of one or more of the plurality of the hardware components by the plurality of the VMs, performs a method of:

establishing an authentication service in a first virtual machine of the plurality of virtual machines, the authentication service using the one or more of the plurality of hardware components to perform a user authentication process;

performing, by the authentication service, the user authentication process and returning a result of the user authentication process to a second virtual machine of the plurality of VMs, in response to a remote procedure call from the second virtual machine and upon determining that an authentication of a user is required;

granting, dynamically and by the virtualization layer, the first virtual machine with exclusive access to one or more of the plurality of hardware components when the authentication service performs the user authentication process by accessing each of the one or more hardware components; and releasing, by the virtualization layer, the one or more hardware components for use by other VMs executing within the computing environment upon the completion of the user authentication process.

* * * * *